United States Patent [19]

Deike et al.

[11] Patent Number: 4,817,660

[45] Date of Patent: Apr. 4, 1989

[54] PRESSURE REGULATING VALVE

[75] Inventors: Karl-Heinz Deike, Pattensen; Bernd Kiel, Wunstorf; Heinz-Werner Konig, Barsinghausen, all of Fed. Rep. of Germany

[73] Assignee: WABCO Westinghouse Fahrzeugbremsen GmbH, Hanover, Fed. Rep. of Germany

[21] Appl. No.: 186,411

[22] Filed: Apr. 26, 1988

[30] Foreign Application Priority Data

May 7, 1987 [DE] Fed. Rep. of Germany ....... 3715148

[51] Int. Cl.$^4$ ........................................... G05D 16/10
[52] U.S. Cl. .................................................. 137/116
[58] Field of Search ............................... 137/115, 116

[56] References Cited

U.S. PATENT DOCUMENTS

| | | |
|---|---|---|
| 2,429,489 | 10/1947 | Roth ..................................... 137/116 |
| 3,586,291 | 6/1971 | Malec . |
| 3,587,619 | 6/1971 | Krechel ............................. 137/116 |
| 3,709,242 | 1/1973 | Chase . |

FOREIGN PATENT DOCUMENTS 2235778 9/1973 Fed. Rep. of Germany .
3222247 12/1983 Fed. Rep. of Germany .
2949434 1/1984 Fed. Rep. of Germany .

Primary Examiner—Robert G. Nilson
Attorney, Agent, or Firm—J. O. Ray, Jr.

[57] ABSTRACT

The present invention provides a pressure regulating valve which substantially avoids shutoff noises. The pressure regulating valve is designed such that the opening process of the shutoff valve proceeds in two steps. The two-step switching process is made possible by the provision of a seal ring which slides on an activating piston which activates the shutoff valve. This seal ring acts upon a housing mounted detent and an activating piston mounted additional detent, thus creating an automatically acting additional surface area for the activating piston. This design also makes it possible to increase the safety function of the pressure regulating valve, by increasing the pressure medium activated surface area of the valve body for the shutoff valve without incurring higher work forces at the activating piston.

19 Claims, 1 Drawing Sheet

PRESSURE REGULATING VALVE

FIELD OF THE INVENTION

The present invention relates, in general, to pressure regulating valves, and, more particularly, this invention relates to a pressure regulating valve wherein noise generation in such valve during operation is substantially reduced.

BACKGROUND OF THE INVENTION

Pressure regulating valves are well known in the prior art and are in widespread use in a number of different applications. One such pressure regulating valve is taught, for example, in German Patent No. DE-OS 32 22 247.

The pressure regulating valve taught in this patent has a valve mechanism that is operated by a piston. This valve also has a pressure chamber which is connected to both a pressure entry port and a pressure exit port. Also, this pressure chamber can be connected to the atmosphere by means of a pressure outlet to evacuate pressure from the valve when necessary. This pressure regulating valve serves as a shutoff valve, which is activated by the piston.

Pressure regulating valves, in general, have the disadvantage of generating a considerable amount of noise during the evacuation of pressure from pressure chamber of such valve. Depending upon the proximity of the valve to persons who may be required to be in the area, this noise generated during such pressure evacuation of the valve can be highly undesirable.

A pressure regulating valve, in addition to its shutoff function, has the function of operating as a safety valve. In this case, even with a malfunction of the piston, the valve will move into the open position upon reaching a predetermined pressure level within the pressure chamber.

In general, a pressure regulating valve having this safety function is designed in such a way and dimensioned in such a manner that the diameter of the activating area of the piston positioned in the valve body and which forms a part of the shutoff valve is pressurized by the pressure medium in the pressure chamber and is larger than the diameter of the housing bore which receives the piston.

This construction of the pressure regulating valve makes it possible for the valve mechanism to be moved into the open position even if the activating piston ceases to function. Movement of such pressure regulating valve will occur as long as a predetermined pressure is obtained in the pressure chamber of the valve.

One problem with such a pressure regulating valve is the size requirement for the operating surface of the valve body which is to be subjected to the pressure in such pressure chamber of the valve. For example, when a relatively large valve area has been selected, in order to achieve a guaranteed safety operation of the valve mechanism, the application of a strong closing force, such as exerted by a heavy spring, for the valve will be required. It follows then that, for activating the piston in the opening direction of the valve mechanism, a large force is required, i.e., a high pressure. Therefore, the opening process of such valve mechanism during normal operation, i.e., during operation as a piston-activated shutoff valve, will be delayed. On the other hand, when the operating area of the valve body is relatively small, the safety function of the pressure regulating valve cannot be guaranteed under all operating conditions to which such valve may be subjected during operation.

SUMMARY OF THE INVENTION

The pressure regulating valve of the present invention includes a housing having a pressure medium inlet port that is connectable to a source of such prssure medium and a pressure medium outlet port which is connectable to at least one consumer of such pressure medium. A control piston is provided within the housing which restricts a first control chamber under a control pressure. Such piston is movable by the control prssure in the first control chamber against the force of a control element. The pressure regulating valve has a first valve medium which is activated by the control piston. The first valve mechanism is positioned in the housing such that it is connected to the first control chamber as well as with a second control chamber. The second control chamber is limited by a first surface area of a second piston which is provided for a second valve mechanism. The second valve mechanism is positioned in a pressure chamber that is connected with the pressure medium inlet port and the pressure medium outlet port. In addition, the pressure medium chamber is connectable with the atmosphere via a second pressure medium outlet. The first surface area of the second piston is arranged in a manner such that the second piston can be moved by the pressure medium in the second control chamber in the direction of the opening of the second valve mechanism. The second piston is surrounded by a sealing element provided to effectively seal the second control chamber and the pressure chamber against each other. Such sealing element is positioned in a longitudinal direction of the second piston and is movable on such second piston proper. A first detent is provided on at least a portion of the outer circumference of the second piston to provide a first abutment surface for the sealing element. This first detent is positioned on the side of the sealing element which is in the opposite side of the second control chamber. A second detent is provided which is rigidly mounted on the housing of the pressure regulating valve. Such second detent is positioned on the side facing the sealing element in the second control chamber. Such second detent provides a second abutment surface for such sealing element. In this manner, the first detent and the second detent are arranged in relationship to each other such that the sealing element is movable between the two detents on the second piston.

OBJECTS OF THE INVENTION

It is, therefore, one of the primary objects of the present invention to provide a pressure regulating valve which substantially minimizes the generation of noise during operation.

Another object of the present invention is to provide a pressure regulating valve in which an improved safety function of the pressure regulating valve during operation can be achieved without an undesirable increase of the activating force due to the required closing spring for the shutoff valve.

In addition to the above-described objects and advantages of the pressure regulating valve of this invention, various other objects and advantages of the present invention will become more readily apparent to those persons who are skilled in the valve art from the following more detailed description of the invention when such description is taken in conjunction with the attached drawing and the appended claims.

BRIEF DESCRIPTION OF THE INVENTION

Figure 1:
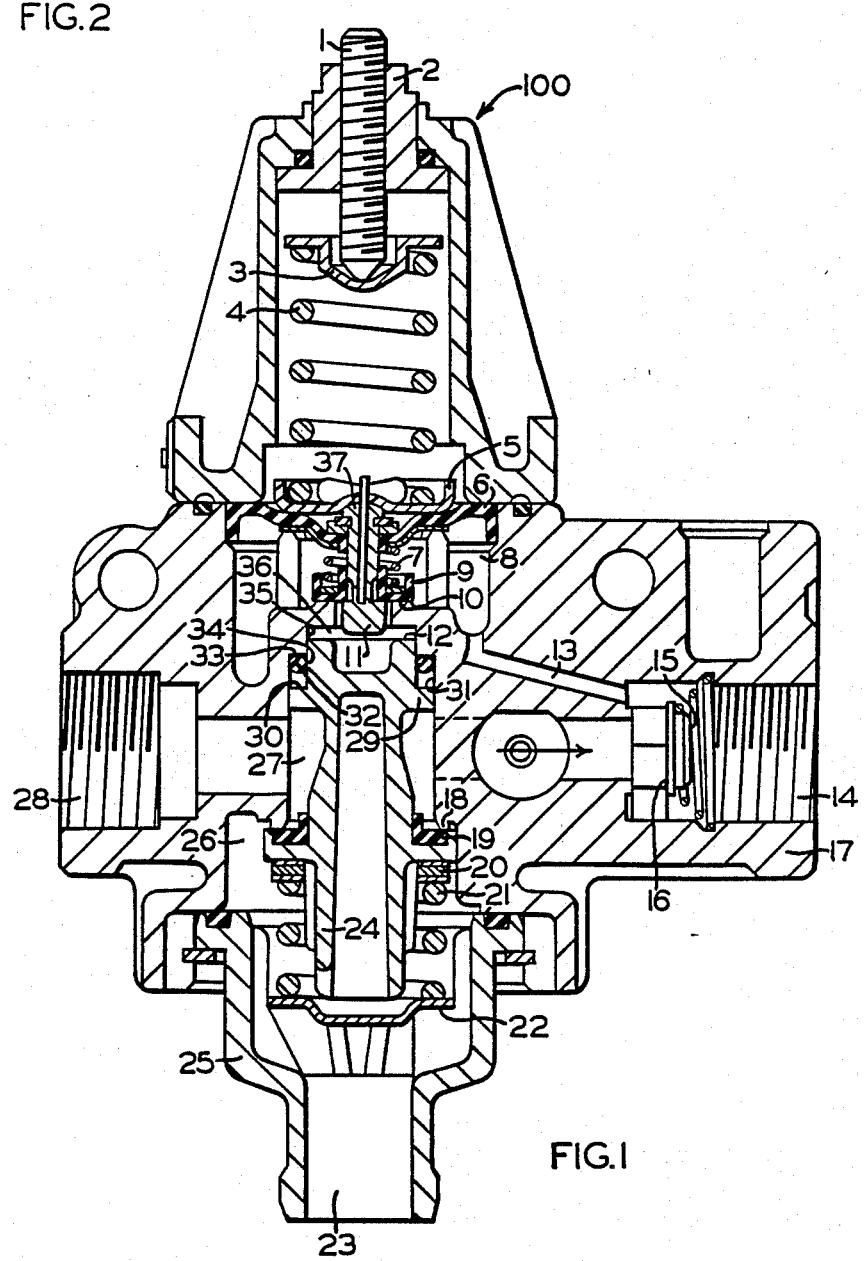
FIG. 1 is a side elevation view in cross-section which illustrates a presently-preferred embodiment of a pressure regulating valve having an area that can be added as an operating surface to a piston of a valve mechanism.

The pressure regulating valve, generally designated 100, illustrated in FIG. 1, includes valve body portion or housing 17. The valve body portion 17 has a pressure inlet port 28 which can be connected to a fluid pressure source (not shown) such as compressed air. A pressure outlet port 14 is provided in the valve body portion 17 of the pressure regulating valve 100. The pressure outlet port 14 is connectable to a consumer (not shown) of such fluid pressure, such as, for example, an air pressure tank or reservoir. The pressure outlet port 14 is connected to a pressure relief valve 15,16. Such pressure relief valve 15,16 is mounted in the flow direction of a pressure mechanism. A housing cover 2 is secured to the valve body portion 17. there is a regulating spring 4 positioned between the housing cover 2 and the valve body portion 17. A membrane-shaped regulating piston 6 is positioned adjacent one end of the regulating spring 4. Such regulating piston 6 is subjected to pressure by such regulating spring 4 and a first Belleville washer 5 positioned intermediate such regulating piston 6 and the one end of the regulating spring 4. The pressure exerted on the regulating piston 6 by the regulating spring 4 is adjustable by means of a set screw 1 which acts on a second Belleville washer 3 positioned adjacent a second end of the regulating spring 4.

Positioned beneath the regulating piston 6 is a first fluid pressure chamber which serves as a control chamber 8. This control chamber 8 is pressurized by way of a fluid communication channel 13, one end of which is in fluid communication with the pressure outlet port 14.

The Belleville washer 5 abuts against a rod member 37 which penetrates the center of the regulating piston 6 and the first control chamber 8. The rod member 37 provides a resistance to the Belleville washer 5 exerted by the regulating spring 4. An exit valve 9,11 for a valve mechanism is formed by one end of the rod member 37 which is shaped as a valve seat 11 and a valve body 9 which is also penetrated by the rod member 37. In the pressure regulating valve 100, the valve body 9 serves a double function with its rigidly-mounted valve seat 10. Such valve body 9 and the rigidly-mounted valve seat 10 become an inlet valve 9,10 for the first valve unit 9,10,11. A compression spring 7 positioned between the bottom of the regulating piston 6 and the valve body 9 retains such valve body 9 under a slight predetermined pressure against the valve seat 10.

An operating piston 24 for a second valve mechanism is provided in the lower part of the valve body portion 17. The fluid pressure supply of such second valve mechanism proceeds over the open inlet valve 10,9 of the first valve mechanism which is connected with the first control chamber 8 and the second control chamber 36. The operating piston 24 in conjunction with the valve body 19, which is rigidly-mounted at the bottom end, and a rigid valve seat 18 serve as a second exit valve 19,18, or the second valve mechanism. A compression spring 21 is located beneath the operating piston 24 which acts against a circular ledge 22 in the valve body portion 17 to exert a pressure on such operating piston 24 over an intermediate member 20 to move the second valve mechanism 19,18 into the closing position. The control piston 6 acts in conjunction with the second exit valve 19,18 in a manner that, during movement of the control piston 6 into the opening direction of the inlet valve 9,10, the pressure medium from the first control chamber 8 will proceed into the second control chamber 36. In this manner, activation of the operating piston 24 into the opening direction of the second exit valve 19,18 is achieved. An opening 26 adjacent a housing member 25, secured to the valve body portion 17, is provided to serve as a pressure release, such opening being connected for fluid communication with the pressure exit chamber 23. Exit chamber 23 serves as a pressure release for the compressed air from the compressor into the atmosphere upon reaching the shutoff pressure.

The activating piston 24 for the second valve mechanism 19,18 includes an operating surface. This operating surface 12 restricts the second control chamber 36 and can be activated by the pressure from the second control chamber 36 in the opening direction of the second valve mechanism 19,18.

Figure 2:
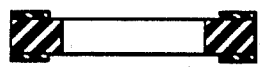
FIG. 2 is a cross-sectional view of an alternative sealing element which seals against fluid pressure flow between the second control chamber and the pressure inlet and the pressure chamber and the connecting pressure outlet.

The first operating surface 12 positioned adjacent the end of the activating piston 24, is surrounded by an O-ring-shaped sealing element 32. The sealing element 32 seals against fluid pressure flow between the second control chamber 36 and the pressure inlet 28, against the pressure chamber 27 and the connecting pressure outlet 14. Alternatively, as shown in FIG. 2, the sealing element may include one of ledges and radial edges fitted thereover. Such one of the ledges and radial edges extending over at least a part of a respective front surface of the sealing element. On at least a part of the circumference of the activating piston 24, a first detent 29 having an abutment surface 30 for the sealing element 32 is provided. The first detent 29 extends radially to the outside. The first detent 29 is arranged in such a way that it is located on the side of the sealing element 32, which is opposite to the second control chamber 36. The first detent 29 stretches radially toward a wall 31 which borders a cavity in the valve body portion 17 and which touches a second control chamber 36. The cavity forms a step defined by surface 31,33,35 with the radially bordering wall of the second control chamber 36. The surface area 33 of the step 31,33,35 forms a rigid stop on the valve body portion 17 for the sealing element 32. In this embodiment, the surface area 33 is located on the side of the sealing element 32 which faces the second control chamber 36.

The diameter of the first surface area 12 of the end section of the activating piston 24 is designed in such a way that, between the radially located wall 35 of the second control chamber 36 and the jacket area 34 of such first surface area 12 of the activating piston 24, a gap will be provided. The pressure medium can be communicated through this gap from the second control chamber 36 to the side of the sealing element 32 which faces the second control chamber 36.

The sealing element 32 is mounted in a movable fashion in the direction of the longitudinal axis of the activating piston 24 between the two surface areas 30 and 32, so that, upon pressurizing of the sealing element 32 with the fluid pressure of the second control chamber 36, the sealing element 32 will move against the surface area 30 located on the first detent 29, thereby acting as an effective second surface area 32 for the activating piston 24 in the direction of the opening of the second valve unit 19,18. This second operating area 32 of the activating piston 24 will become ineffective when the fluid pressure in the pressure chamber 27, which is connected with the pressure inlet 28 and the pressure outlet 14, is pressurized by the sealing element 32 on the side opposite to the second control chamber 36, which is equal to or larger than the fluid pressure in the second control chamber 36.

The operational function of the previously-described pressure regulating valve 100 will be explained by way of the following.

The fluid compressor generated compressed air flows by way of the pressure inlet 28, the pressure chamber 27, the relief valve 15,16 which was brought into the open position by the air pressure communicated thereto, and the pressure exit, into the compressed air storage tank. Fluid pressure communication between the pressure inlet 28 and the pressure outlet 14 is effected by means of the pressure chamber 27 and a channel connected to the pressure chamber 27 and pressure outlet 14. The compressed air moves through the gap between the first detent 29 and the wall 31 and reaches the opposite side of the sealing element 32 of the second control chamber 36. At this point, such compressed air then moves the sealing element 32 in the direction of the surface area 33 located on the valve body portion 17.

At the same time, compressed air is communicated from the pressure exit 14 by way of a conduit 13 into the first control chamber 8 below the control piston 6. In the first control chamber 8, a pressure will develop which acts on the bottom side of the control piston 6. As soon as this pressure becomes larger than the pressure of the set screw 1 adjusted pressure of the compression spring 4, the membrane-type control piston 6 will bulge toward the top and carries the rod member 37 with it.

The inlet valve 9,10 of the first valve mechanism 9,10,11 will now open so that the air in the first control chamber 8 can be communicated into the second control chamber 36.

The fluid pressure which is developing will act upon the first surface area 12 of the operating piston 24 and thereby move the activating piston 24 against the spring 21 in a downward direction, as viewed in the drawing Figure.

At this point, the exit valve 19,18 of the second valve mechanism opens and the compressed air supplied by the compressor will be communicated through a pressure release chamber 26 and the pressure mechanism outlet 23 into the atmosphere. Through the gap between the radial wall of the second control chamber 36 and the jacket surface 34 of the activating piston 24, the compressed air is communicated to the side of the sealing element 32 facing the second control chamber 36 and applies pressure on the sealing element 32 in the direction of the abutment surface 30 on the first detent 29. In view of the fact that the force generated by the fluid pressure in the pressure chamber 27 and in the second control chamber 36 are generally of the same magnitude and are oppositely acting forces on the sealing element 32, the sealing element 32 remains substantially in its then existing position. On the other hand, when the fluid pressure in the pressure chamber 27 and the respective pressure inlet 28 and pressure outlet 14 has fallen to a point in which the fluid pressure on the sealing element 32 in the second control chamber 36 will increase and become larger than the force of the fluid pressure in the pressure chamber 27 acting in the opposite direction on the sealing element 32, then such sealing element 32 will move downwardly against the abutment surface 30 on the first detent 29 and seat against such abutment surface 30 on the first detent.

In this fashion, a second circular surface area for the activating piston 24 is formed by the sealing element 32 seating against the abutment surface 30 on the first detent 29. With the addition to the first surface area 12 and the second surface area (formed by the sealing element 32 and the abutment surface 30 of the first detent 29), acting in the same direction on the second control chamber 36, an enlarged total surface area at the activating piston 24 is achieved. This larger surface area at the activating piston 24 results in a more rapid movement in the opening direction of the second valve mechanism 19,18.

As a result, the outlet cross-section of such second valve mechanism 19,18 increases the acceleration rate.

The fluid compressor supplied air present in the pressure chamber 27 will be released to the atmosphere without pressure by way of the open exit valve of the second valve mechanism 19,18 and the pressure medium exit 23.

When the fluid pressure in the storage tank declines, the prssure in the first control chamber 8 will also be reduced. The inlet valve 9,10 of the first valve mechanism 9,10,11 then closes and the outlet valve 9,11 of the first valve mechanism 9,10,11 opens. The second control chamber 36 will be depressurized by way of the outlet valve 9,10 of the first valve mechanism 9,10,11. As a consequence of the force exerted by the spring 21 on the activating piston 24 in the closing direction of the outlet valve of the second valve mechanism 29,18, the activating piston 24 will be moved in the direction of the second control chamber 36. The outlet valve of the second valve mechanism 19,18 is now also moving into the closing position.

The fluid pressure which will reestablish itself in the prssure chamber 27 causes the relief valve 15,16 to be brought into the open position. This allows compressed air from the fluid compressor to be communicated through the pressure chamber 27 and the open relief valve 15,16 and into the air pressure reservoir (not shown). At the same time, the compressed air from the pressure chamber 37 will exert a force on the sealing element 32 in the direction of the second control chamber 36. Now the sealing element 32 will move away from the abutment surface 30 on the first detent 29 and into engagement with the surface 33 on the valve body portion 17. At this position the sealing element 32 will cease to function as a second surface area for the activating piston 24.

As shown in the illustration of the presently-preferred embodiment of the pressure regulating valve 100 constructed according to the present invention, the first detent 30 on the activating piston 24 can be shaped to form a circular ledge secured to the activating piston 24. It should also be understood that it is within the scope of the present invention to provide a plurality of ledges which extend in a radially outwardly direction from the body of the activating piston 24. Such plurality of ledges must, however, be shaped in such a way that they cannot cause the sealing element 32 to bulge during use.

It should also be noted that even through the surface area 33 on the valve body portion 17 is formed as a portion of a step in such valve body portion, as illustrated in the drawings, it could also be a circular ledge or a plurality of individual ledges which are positioned radially to the bore for receiving the activating piston 24.

It is further possible, in the pressure regulating valve 100 of this invention, to adapt the sealing element 32 adjacent its face (i.e., the sides which seat against the abutment surfaces 80 or 33, or the radially extending ledges described above) so that the fluid pressure medium from the second control chamber 36 on the pressure chamber 27 can be applied against the face of such sealing element 32. In this case, the ledges or detents would extend across at least a portion of the area which constitutes a respective face of such sealing element 32.

Upon operating failure of the activating piston 24 in the pressure regulating valve 100 of this invention, the valve body 19 upon reaching a predetermined pressure in the pressure chamber 27 will be lifted from the valve seat 18 and the pressure medium in the pressure chamber 27 will be bled off into the atmosphere by way of the outlet 23. This safety function is thus assured for all operating conditions. This is the case because the pressure from the pressure chamber 27 acting on the surface area of the valve body portion 19 of the second valve mechanism has a larger diameter than the bore in such valve body portion 17 receiving the actuating piston 24.

The pressure regulating valve 100 can, as described above, be fitted with a relief valve 15,16 which opens in flow direction and is mounted at the pressure medium outlet 14, as well as with a conduit 13, leading from the pressure outlet to the first control chamber 8. The pressure regulating valve 100 can also be controlled by remote control. When the pressure regulating valve 100 is remote controlled, the relief valve 15,16 can be dispensed with. For pressurizing the first control chamber 8, a separate pressure connection which is not connected with the pressure medium outlet can be provided.

Significant for this invention is that the sealing element 32 is mounted in a movable manner on the activating piston 24 in the direction of the longitudinal axis of the activating piston 24 proper, and can be moved against a detent positioned adjacent the activating piston 24 in addition to a valve body portion 19 mounted detent. Further, the sealing element 32 can be pressurized by the fluid pressure in the second control chamber as well as by the pressure in the pressure chamber which connects the pressure entry port and the pressure outlet port.

As will be recognized by persons skilled in the valve art, the pressure regulating valve 100 of the present invention provides the specific advantage that, during operation of such pressure regulating valve 100, an automatic addition of a supplementary surface area at the activating piston 24 is being formed by a sealing element 32 which acts against the activating piston 24 during shutoff (opening motion of valve), which at first proceeds slowly and then more rapidly. Since the opening cross-section of the valve proceeds slowly at first, and then more rapidly, the exit of the compressed air from the pressure chamber does not proceed instantaneously. The result will be a much improved reduction in noise formation.

Further, it will be recognized that by the automatic addition of the active surface area at the activating piston 24, the advantage of increasing the valve body for the shutoff valve in order to accomplish an improved safety function of the pressure regulating valve 100 during operation is achieved. This improved safety function is obtainable without an increase of the activating force required due to the closing spring for the shutoff valve.

While a presently-preferred embodiment of the pressure regulating valve of the present invention as well as certain alternative embodiments have been described in detail above, it should be obvious to those persons skilled in the valve art that various other modifications and adaptations of such pressure regulating valve can be made without departing from the spirit and scope of the attached claims.

We claim:

1. A pressure regulating valve having reduced noise generation capability when used in a fluid pressure system, said pressure regulating valve comprising:
    (a) a valve body portion having a fluid pressure medium inlet port connectable with a source of fluid pressure and a fluid pressure outlet port connectable with at least one consumer of such fluid pressure;
    (b) a control piston positioned within a first control chamber which restricts fluid pressure communication and by a control pressure can be moved in an axial direction within said first control chamber against a force of a control element positioned adjacent said control piston;
    (c) a first valve mechanism positioned within said valve body portion and connected with said first control chamber and with a second control chamber, said first valve mechanism being activated by said control piston;
    (d) said second control chamber being limited on one side thereof by a first surface area of an activating piston which forms a part of a second valve mechanism, said activating piston being positioned in a pressure chamber formed in said valve body portion, said pressure chamber being connected for fluid communication with each of said fluid pressure medium inlet port and said fluid pressure outlet port and to a pressure medium exhaust port to atmosphere;
    (e) said first surface area on said activating piston being positioned such that said activating piston can be moved, by fluid pressure communication to said second control chamber, in a direction of an opening of said second valve mechanism;
    (f) a sealing element positioned around said activating piston to seal said second control chamber and said pressure chamber against each other, said sealing element being movable on a body portion of said activating piston;
    (g) a first detent positioned on a portion of an outer circumference of said activating piston which engages a first face of said sealing element, said first detent being located on a side of said sealing element which is on an opposite side of said second control chamber; and
    (h) a second detent positioned on said valve body portion which engages a second face of said sealing element, said second detent being located on a side facing said sealing element in said second control chamber, said first detent and said second detent being positioned in relation to each other such that said sealing element can be moved between them and over said outer circumference of said activating piston.

2. A pressure regulating valve, according to claim 1, wherein said pressure regulating valve further includes a relief valve positioned adjacent said fluid pressure outlet port and which opens in a direction of a consumer.

3. A pressure regulating valve, according to claim 1, wherein said first detent is formed as a ledge surrounding said activating piston.

4. A pressure regulating valve, according to claim 1, wherein said first detent consists of a plurality of ledges on said activating piston which extend in a radially outwardly direction.

5. A pressure regulating valve, according to claim 1, wherein said second detent positioned on said valve body member is formed as a circular ledge which radially extends toward said activating piston.

6. A pressure regulating valve, according to claim 1, wherein said second detent consists of a plurality of ledges on said valve body portion which extend in a radial direction toward said activating piston.

7. A pressure regulating valve, according to claim 1, wherein said second control chamber serves as a guide for said activating piston adjacent said first surface area of said activating piston.

8. A pressure regulating valve, according to claim 1, wherein said pressure chamber is formed by a bore in said valve body portion and has a larger diameter than said second control chamber.

9. A pressure regulating valve, according to claim 1, wherein a wall enclosing said second control chamber and a wall forming said first control chamber form a stop which serves as said second detent.

10. A pressure regulating valve, according to claim 9, wherein said first detent extends radially outwardly from said activating piston substantially to said wall forming said first control chamber.

11. A pressure regulating valve, according to claim 1, wherein at least one side of said sealing element includes one of ledges and radial edges fitted thereover, said one of said ledges and radial edges extending over at least a part of a respective front surface of said sealing element.

12. A pressure regulating valve, according to claim 1, wherein said second valve mechanism is formed such that on one of reaching and exceeding a predetermined pressure in said pressure chamber said pressure chamber is connected for fluid communication to atmosphere.

13. A pressure regulating valve, according to claim 2, wherein said second valve mechanism is formed such that on one of reaching and exceeding a predetermined pressure in said pressure chamber said pressure chamber is connected for fluid communication to atmoshpere.

14. A pressure regulating valve, according to claim 3, wherein said second valve mechanism is formed such that on one of reaching and exceeding a predetermined pressure in said pressure chamber said pressure chamber is connected for fluid communication to atmosphere.

15. A pressure regulating valve, according to claim 5, wherein said second valve mechanism is formed such that on one of reaching and exceeding a predetermined pressure in said pressure chamber said pressure chamber is connected for fluid communication to atmosphere.

16. A pressure regulating valve, according to claim 7, wherein said second valve mechanism is formed such that on one of reaching and exceeding a predetermined pressure in said pressure chamber said pressure chamber is connected for fluid communication to atmosphere.

17. A pressure regulating valve, according to claim 8, wherein said second valve mechanism is formed such that on one of reaching and exceeding a predetermined pressure in said pressure chamber said pressure chamber is connected for fluid communication to atmosphere.

18. A pressure regulating valve, according to claim 9, wherein said second valve mechanism is formed such that on one of reaching and exceeding a predetermined pressure in said pressure chamber said pressure chamber is connected for fluid communication to atmosphere.

19. A pressure regulating valve, according to claim 6, wherein said second valve mechanism is formed such that on one of reaching and exceeding a predetermined pressure in said pressure chamber said pressure chamber is connected for fluid communication to atmosphere.

* * * * *